US009077879B2

(12) United States Patent
Dinesen

(10) Patent No.: US 9,077,879 B2
(45) Date of Patent: Jul. 7, 2015

(54) ARRAY CAMERA

(71) Applicant: Palle Geltzer Dinesen, Shenzhen (CN)

(72) Inventor: Palle Geltzer Dinesen, Shenzhen (CN)

(73) Assignees: AAC ACOUSTIC TECHNOLOGIES (SHENZHEN) CO., LTD., Shenzhen (CN); AAC ACOUSTIC TECHNOLOGIES (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 13/737,939

(22) Filed: Jan. 9, 2013

(65) Prior Publication Data
US 2014/0192252 A1 Jul. 10, 2014

(51) Int. Cl.
H04N 5/225 (2006.01)
G02B 27/10 (2006.01)

(52) U.S. Cl.
CPC ........... *H04N 5/2254* (2013.01); *H04N 5/2257* (2013.01); *H04N 5/2258* (2013.01)

(58) Field of Classification Search
CPC ............... H04N 5/2253; H04N 5/2254; H01L 27/14625; H01L 27/14627
USPC ........................... 348/335–340; 359/619–626
See application file for complete search history.

(56) References Cited

U.S. PATENT DOCUMENTS

| 2002/0122124 | A1* | 9/2002 | Suda | 348/263 |
| 2003/0215967 | A1* | 11/2003 | Shizukuishi | 438/22 |
| 2005/0225654 | A1* | 10/2005 | Feldman et al. | 348/272 |
| 2008/0192357 | A1* | 8/2008 | Boettiger et al. | 359/626 |
| 2009/0225205 | A1* | 9/2009 | Takagi | 348/294 |
| 2011/0209328 | A1* | 9/2011 | Steenblik et al. | 29/428 |
| 2011/0234883 | A1* | 9/2011 | Li et al. | 348/340 |
| 2011/0304753 | A1* | 12/2011 | Shintani | 348/279 |
| 2012/0229688 | A1* | 9/2012 | Tajiri | 348/335 |
| 2013/0070060 | A1* | 3/2013 | Chatterjee et al. | 348/47 |
| 2013/0182155 | A1* | 7/2013 | Egawa | 348/294 |
| 2013/0314583 | A1* | 11/2013 | Tang | 348/345 |

* cited by examiner

*Primary Examiner* — Kelly L Jerabek
(74) *Attorney, Agent, or Firm* — Anova Law Group, PLLC

(57) ABSTRACT

Disclosed is an array camera. The array camera includes an array camera comprising an image sensor sectioned into at least two channels and at least two lens modules each positioned on a top of one of the channels. Each channel consists of an active sensor area and a dead space. Each lens module has a barrel. Each barrel of the lens modules has an inner sidewall facing the adjacent lens modules and an outer sidewall opposite to the inner surface. Wherein, a projection of the inner sidewall of each barrel along the optical axis is an inner line on the corresponding channel of the image sensor and the inner line is substantially superposed with a part of the outline of the active sensor. The array camera has a small size.

5 Claims, 6 Drawing Sheets

ARRAY CAMERA

FIELD OF THE INVENTION

The present invention generally relates to a camera, and more particularly, to an array camera.

DESCRIPTION OF RELATED ART

Referring to FIGS. 1 and 2, an typical array camera comprises a image sensor 1' sectioned into at least two channels 11' and at least two lens modules 2' positioned on top of each of the channels 11'. The purpose of the array camera is to split the image sensor 1' into at least two parts and then subsequently recombine partial images from the channels 11' into a single image with improved image quality. In this type of array camera configuration, the image sensor 1' is sectioned into four channels 11'. Each lens module comprises a barrel 21' and at least one lens (no shown) received in the barrel 21'. Each barrel 21' has a rotationally symmetric cross section and a projection of the barrel 21' along the optical axis forms a rotationally symmetric image area 22' onto the corresponding channel 11' of the image sensor 1'. And each channel 11' has an active sensor area 111' with a rectangular or square shape for collecting light from the lens module 2' and a dead space 112' opposite to the active sensor area 111'. In order for the array camera to be most efficient and have the lowest possible cost, it is desirable that dead space 112' should be kept small to reduce the size of the image sensor as much as possible.

In order for each of lens modules to form an image onto the corresponding entire active sensor area of the image sensor, each image area formed through the corresponding lens module must be equal to or larger than the diagonal of the corresponding active sensor area of the image sensor. However, in the case of the array camera, when the dead space is designed to be kept too small, there will be an overlap between the image areas formed by lens modules for different channels. Furthermore, the barrels will physically collide with each other and there will be inadequate room for all the barrels.

DETAILED DESCRIPTION OF THE EXEMPLARY EMBODIMENTS

Figure 1:
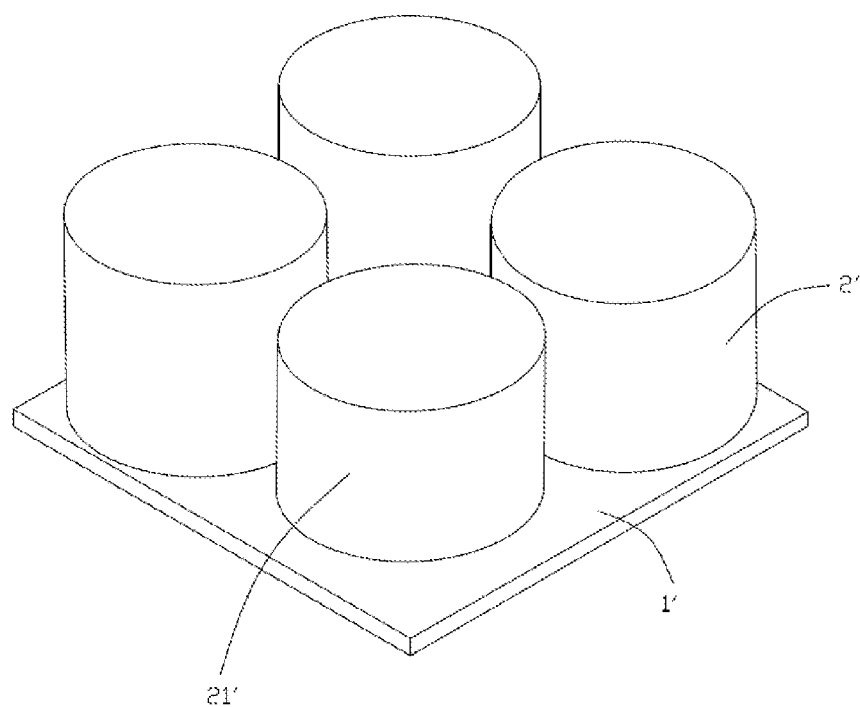
FIG. 1 illustrates an array camera related to the present disclosure.
Figure 2:
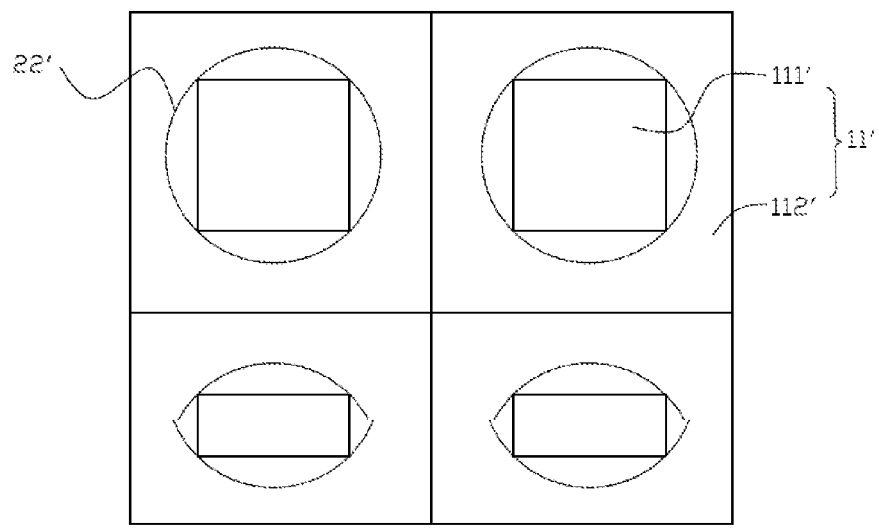
FIG. 2 is a schematic of a top view of the array camera shown in FIG. 1.
Figure 3:
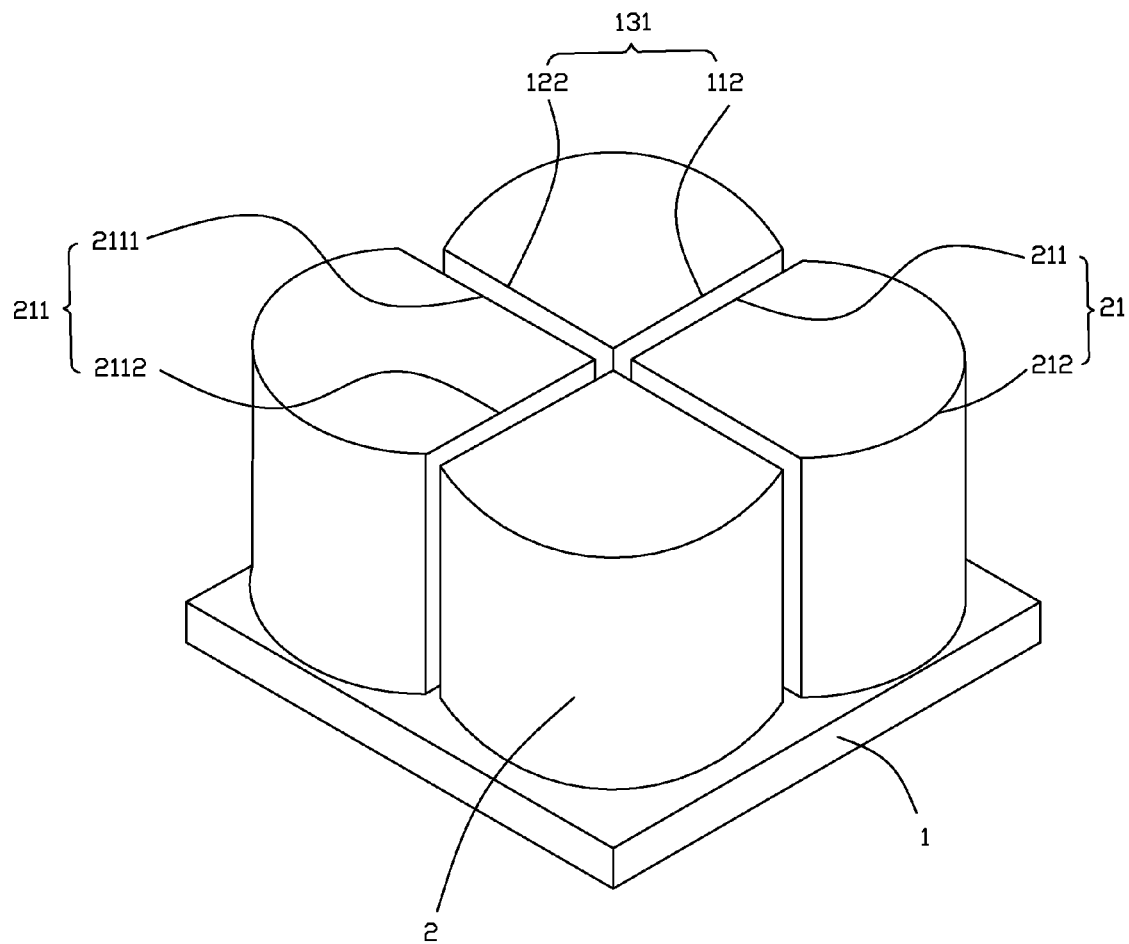
FIG. 3 is an illustrative assembled view of an array camera in accordance with a first exemplary embodiment of the present disclosure.
Figure 4:
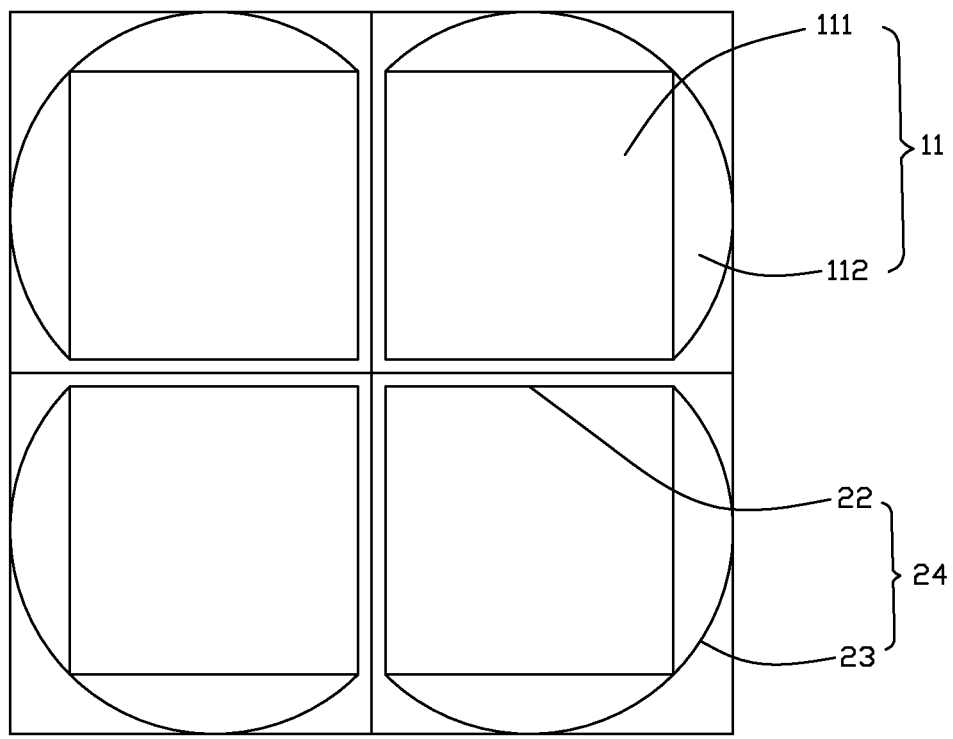
FIG. 4 is a schematic of top view of the array camera shown in FIG. 3.

Reference will now be made to describe the exemplary embodiments of the present disclosure in detail. Referring to FIGS. 3 and 4, an array camera in accordance with a first exemplary embodiment of the present disclosure comprises an image sensor 1 sectioned into four channels 11 and four lens modules 2 each positioned on a top of one of the channels 11. The channels 11 are arranged in two rows and two columns. Each channel 11 of the image sensor 1 consists of an active sensor area 111 with a rectangular or square shape for collecting light from the corresponding lens module 2 and the rest is a dead space 112. Each lens module 2 comprises a barrel 21 and at least one lens (no shown) received in the barrel 21. Each barrel 21 of the lens modules 2 has an inner sidewall 211 facing the adjacent lens modules 2 and an outer sidewall 212 opposite to the inner sidewall 211. In this embodiment, the inner sidewall 211 of each lens modules 2 comprises a first inner sidewall 2111 and a second inner sidewall 2112 perpendicular to the first inner sidewall 2111. The outer sidewall 2112 of each lens modules 2 is configured to be a part of a circle.

A projection of the inner sidewall 211 of each barrel 21 along the optical axis is an inner line 22 on the corresponding channel 11 of the image sensor 1. A projection of the outer sidewall 2112 of each barrel 21 along the optical axis is an outer curve 23 on the corresponding channel 11 of the image sensor 1. The inner line 22 together with the outer curve 23 forms an image area 24 on the corresponding channel 11. The inner line 22 is substantially superposed with a part of the outline of the active sensor 111 for reducing the size of the dead space 112 and keeping the active sensor area 111 as larger as possible.

Figure 5:
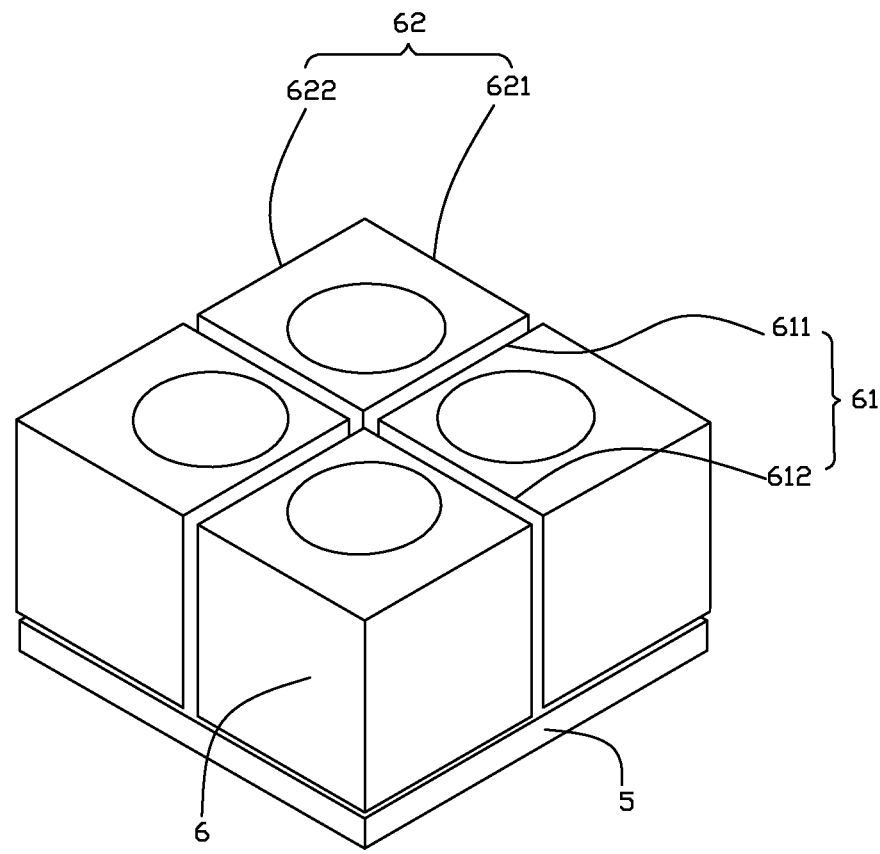
FIG. 5 is an illustrative assembled view of an array camera in accordance with a second exemplary embodiment of the present disclosure.
Figure 6:
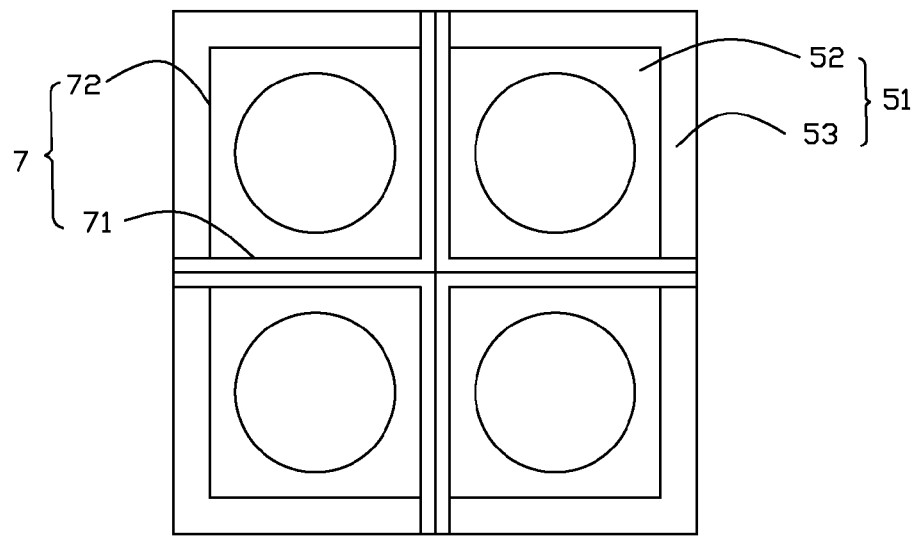
FIG. 6 is a schematic of top view of the array camera shown in FIG. 5.
Figure 7:
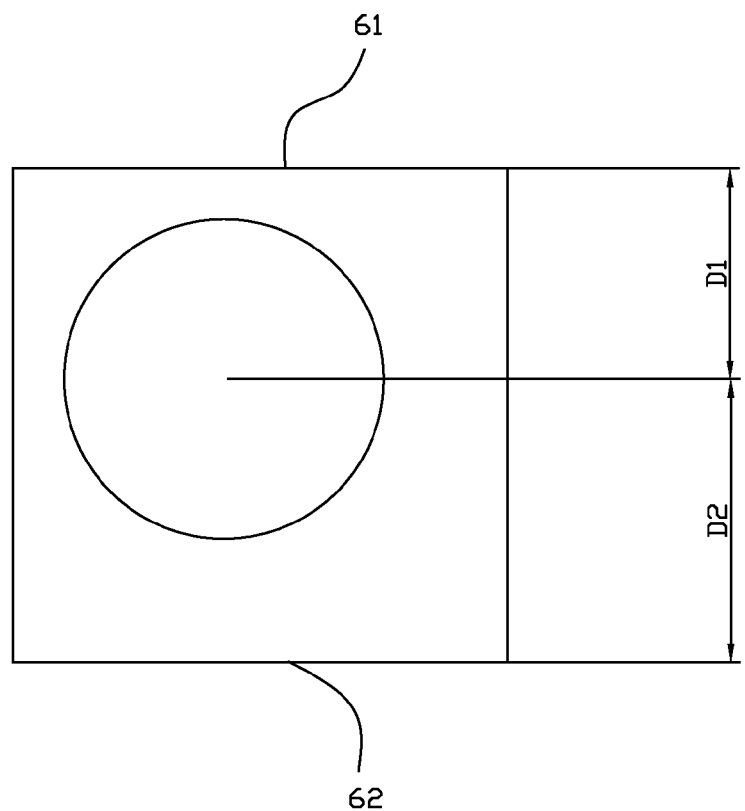
FIG. 7 is an illustrative top view of a lens module of the array camera in FIG. 5.

A second embodiment of the present disclosure is shown in FIGS. 5-7, an array camera comprises an image sensor 5 sectioned into four channels 51 and four lens modules 6 each positioned on a top of one of the channels 51. Each channel 51 of the image sensor 5 consists of an active sensor area 52 with a rectangular or square shape for collecting light from the corresponding lens module and the rest is a dead space 53. Each lens module 6 is realized as a wafer-level lens module having a square or rectangular cross section. Each lens module 6 comprises an inner sidewall 61 facing the adjacent lens modules 6 and an outer sidewall 62 opposite to the inner sidewall 61. The inner sidewall 61 of each lens modules 6 comprises a first inner sidewall 611 and a second inner sidewall 612 perpendicular to the first inner sidewall 611. The outer sidewall 62 of each lens modules 6 comprises a first outer sidewall 621 and a second outer sidewall 622 perpendicular to the first outer sidewall 621. Each lens module has a first distance D1 between the inner sidewall 61 and a center of the corresponding lens module and a second distance D2 between the outer sidewall 62 and a center of the corresponding lens module. The first distance D1 is smaller than the second distance D2.

A projection of the inner sidewall 61 of each lens modules 6 along the optical axis is an inner line 71 on the corresponding channel 51 of the image sensor 5. A projection of the outer sidewall 62 of each lens modules 6 along the optical axis is an outer curve 72 on the corresponding channel 51 of the image sensor 5. The inner line 71 together with the outer curve 72 forms an image area 7 on the corresponding channel 51. The inner line 71 is substantially superposed with a part of the outline of the active sensor 52 for reducing the size of the dead space 53 and keeping the active sensor 52 as larger as possible. In order to achieve the image sensor that must be kept small to reduce the size of the array camera, this implies that the inner sidewall of each lens modules will be diced compared with the prior art of wafer-level lens module.

It should be noted that although the array camera is depicted in a four lens modules and four channels configuration, the array camera subsystem can be employed in a configuration having any multiple numbers and shapes of lens modules and channels.

While the present invention has been described with reference to the specific embodiments, the description of the invention is illustrative and is not to be construed as limiting the invention. Various of modifications to the present invention can be made to the exemplary embodiments by those skilled in the art without departing from the true spirit and scope of the invention as defined by the appended claims.

What is claimed is:

1. An array camera comprising:
   an image sensor sectioned into at least two channels, each channel consisting of an active sensor area and a dead space; and
   at least two lens modules each positioned on a top of one of the channels, each lens module having a barrel, each barrel of the lens modules having an inner sidewall facing the adjacent lens modules and an outer sidewall opposite to the inner surface, each of the lens modules imaging a view of the scene directly on to a corresponding area of the image sensor;
   wherein, a projection of the inner sidewall of each barrel along the optical axis is an inner line on the corresponding channel of the image sensor and the inner line is substantially superposed with a part of the outline of the active sensor.

2. The array camera as described in claim 1, wherein the lens module is realized as a wafer-level lens module.

3. The array camera as described in claim 1, wherein the outer sidewall of each lens modules is configured to be a part of a circle.

4. The array camera as described in claim 1, wherein the inner sidewall of each lens module comprises a first inner sidewall and a second inner sidewall perpendicular to the first inner sidewall.

5. The array camera as described in claim 1, wherein each lens module has a first distance between the inner sidewall and a center of the corresponding lens module and a second distance between the outer sidewall and a center of the corresponding lens module, the first distance is smaller than the second distance.

* * * * *